(12) United States Patent
Neuner et al.

(10) Patent No.: US 6,186,686 B1
(45) Date of Patent: Feb. 13, 2001

(54) APPLICATOR FOR LIQUID MATERIAL

(75) Inventors: Charles Neuner, Amityville; Volker Schrepf, East Islip, both of NY (US)

(73) Assignee: Henlopen Manufacturing Co., Inc., Melville, NY (US)

( * ) Notice: Under 35 U.S.C. 154(b), the term of this patent shall be extended for 0 days.

(21) Appl. No.: 09/108,098

(22) Filed: Jun. 30, 1998

Related U.S. Application Data

(60) Provisional application No. 60/052,783, filed on Jul. 2, 1997.

(51) Int. Cl.$^7$ .................................................. A45D 40/04
(52) U.S. Cl. ............................................. 401/75; 401/132
(58) Field of Search .................... 401/68, 75, 76, 401/132, 172, 174, 266

(56) References Cited

U.S. PATENT DOCUMENTS

| | | | |
|---|---|---|---|
| 2,374,065 | * 4/1945 | Worthington | 401/11 |
| 2,457,342 | * 12/1948 | Braselton | 401/11 |
| 3,825,021 | * 7/1974 | Seidler | 401/75 |
| 3,826,580 | * 7/1974 | Bohli | 401/132 |
| 4,878,775 | * 11/1989 | Norbury et al. | 401/132 |
| 5,009,534 | * 4/1991 | Gueret | 401/75 |
| 5,019,033 | * 5/1991 | Geria | 401/266 |
| 5,772,347 | * 6/1998 | Gueret | 401/266 |

FOREIGN PATENT DOCUMENTS

| | | | |
|---|---|---|---|
| 182655 | * 5/1986 | (EP) | 401/68 |
| 913133 | * 8/1946 | (FR) | 401/75 |
| 436110 | * 6/1948 | (IT) | 401/75 |

\* cited by examiner

*Primary Examiner*—Charles R. Eloshway
(74) *Attorney, Agent, or Firm*—Cooper & Dunham LLP

(57) ABSTRACT

A dispenser and applicator for liquid cosmetic material, such as liquid, semiliquid or pasty lip or eye cosmetic products, or for microencapsulated liquid products, including a rigid, axially elongated reservoir tube for holding the cosmetic material, a manually operable driver assembly for exerting pressure on the material within the tube, and an applicator tip having a planar woven mesh screen extending across an outlet end opening and molded in the applicator tip. The driver assembly forces the contained material forwardly through the screen, which the user applies to the lip or eye region of the face, or other selected skin area. In the case of a microencapsulated product, the microcapsules rupture when they are pressed against the mesh, releasing their contents.

29 Claims, 5 Drawing Sheets

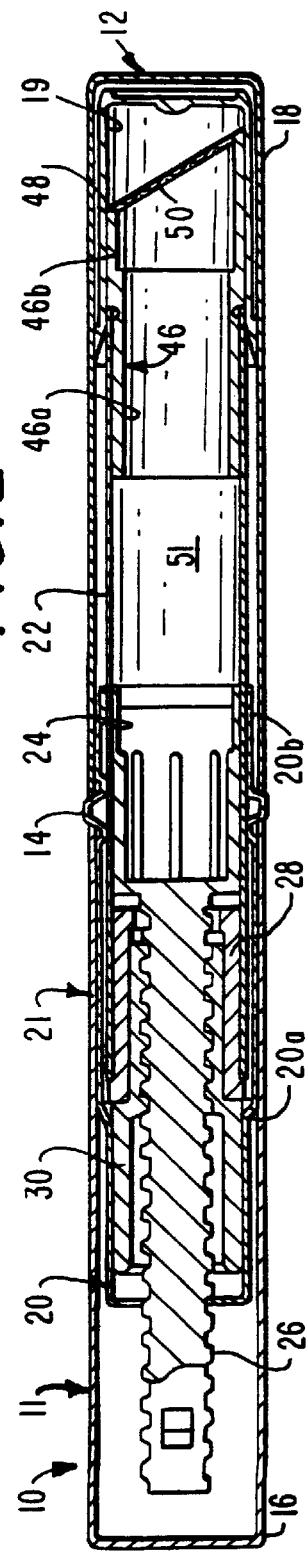
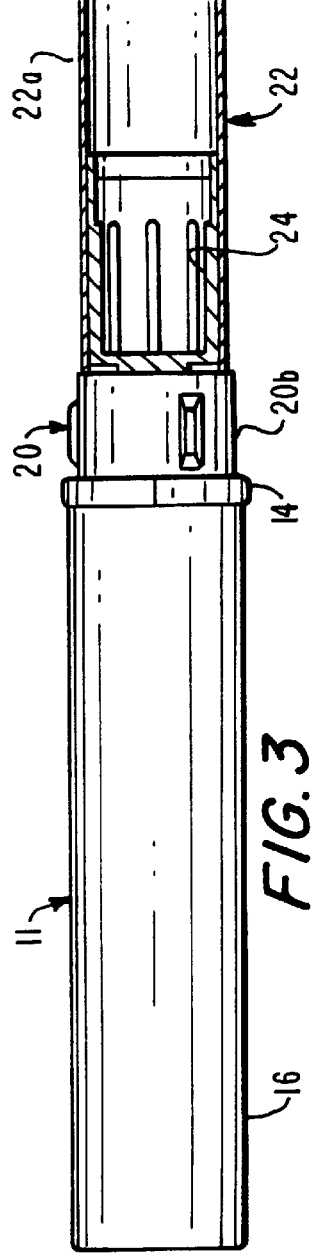
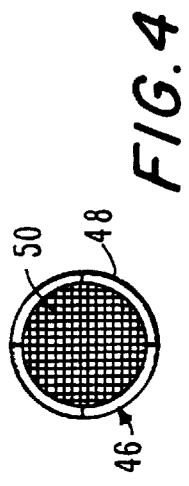
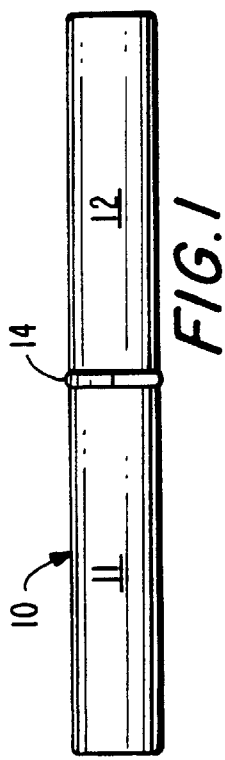

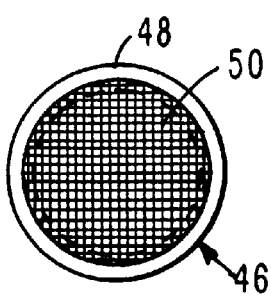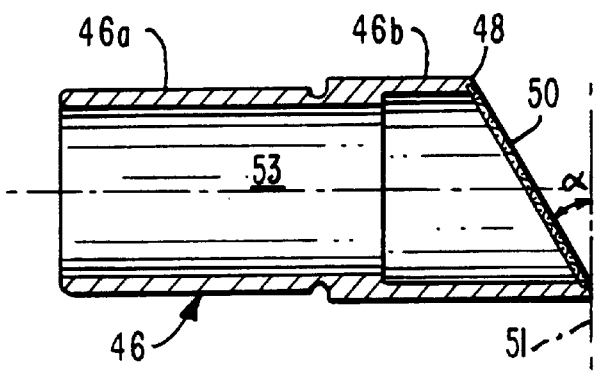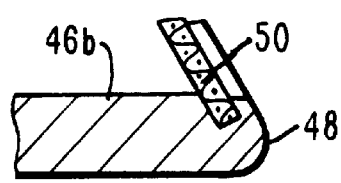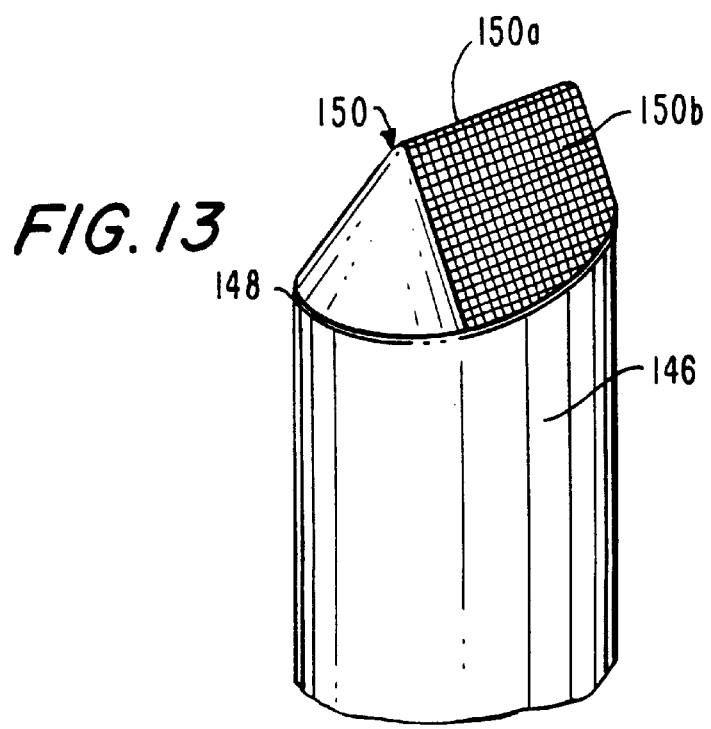

APPLICATOR FOR LIQUID MATERIAL

CROSS REFERENCE TO RELATED APPLICATION

This application claims the benefit of the filing date of copending U.S. provisional patent application No. 60/052,783, filed Jul. 2, 1997.

BACKGROUND OF THE INVENTION

This invention relates to applicators for liquid or like fluent material, and in particular to hand-held applicators and dispensers for containing and applying fluent cosmetic material. The term "cosmetic material" is used herein broadly to designate material which is applicable to a portion of a user's face and/or other skin area and, in this broad sense, includes materials generally which alter, conceal or enhance appearance or odor or provide skin protection or treatment as thus applied.

In one specific aspect, the invention is directed to applicators and dispensers for liquid cosmetic material. The term "liquid cosmetic material" herein refers to cosmetic material which is in a liquid, semiliquid or pasty form, in contrast to more or less hard, solid shape-sustaining materials such as a conventional lipstick "bullet." Examples of liquid cosmetic material include liquid lip products (lip glosses, lip balms, lip moisturizers, lip coloring and long-lasting lipstick products), eye shadows and eye treatment systems. For purposes of specific illustration, detailed reference will be made herein to applicators for liquid cosmetic materials for the lips.

Present-day commercially available cosmetic materials for application to the lips are either in the form of a hard or semi-hard mass, such as lipstick bullets in various lengths and diameters, or are liquid cosmetic materials as defined above, having a viscosity that ranges from liquid to semiliquid or pasty. A typical viscosity range for liquid lip cosmetic materials is between about 1,500 and about 25,000 centipoise.

Today's lip and eye products are provided with many different types of applicators. The most popular and currently most widely used application systems for lipsticks are direct transfer types, wherein (in the case of hard or semi-hard products) the product is transferred from a lipstick bullet directly to the lips. In some instances the bullet is surrounded by a metal sleeve having an obliquely angled opening corresponding to the obliquely angled application surface of the bullet. Application of liquid lip (and eye) products is accomplished by either a pump system, where the product is pushed through the center of an application brush, or a container and rod system, the latter being very similar to mascara applicators with the exception that a knotted or gathered brush or a flocked tip is used to transfer the product from the container to the lips or eyes rather than a twisted wire brush as is commonly employed for mascara. All these systems have inherent problems.

The current trend in the cosmetic industry to favor softer (more liquid) products limits the use of bullet type application systems. Bullet type application is not feasible with the softer types of products because the cosmetic material bullet itself, which actually transfers the mass to the lips or eyes, does not have the strength (if it is constituted of such softer cosmetic material masses) to support the pressures of application; hence the bullet breaks off during the application or completely deforms into an unusable mass.

The pump/brush systems and the container/rod systems are a potential answer to the needs of application for softer masses. Unfortunately, both systems have application inadequacies and/or cost constraints. Pump/brush systems require re-education of the consumer for application, are more complex to use, require a certain dexterity, and give a different look after application (as compared to bullet type applicators), which is not always preferred by the users; also, they are complex and costly mechanisms.

The container/rod systems have limitations in their ability to apply higher viscosity products (within the liquid cosmetic material viscosity range) because these systems require a certain degree of cold flow of product to enable the product to coat the applicator evenly, which in turn is necessary for proper and even application. With the higher viscosity liquids these applicators tend to clump the product unevenly rather than to apply a continuous dose. Also there is an inconvenience with these systems in that the applicator is at some distance from the holding point (the cap) and its satisfactory manipulation thus requires some dexterity and coordination during application, unlike the bullet type lipstick which the consumer can hold very close to the point of application thereby easily maintaining very precise control.

In a second aspect, the invention is directed to applicators and dispensers for microcapsules. It is known to provide fluent, e.g. liquid, cosmetic materials in microcapsules having a rupturable shell, e.g., to protect the contained material from exposure to air before application. The size of the microcapsules typically or generally ranges from about one to about 1200 microns in size. A preferred range, for at least many purposes, is between about 5 and about 500 microns. Materials used in making the capsule shell may include, without limitation, natural or organic materials such as gelatin, gum arabic, agar, sugar, starch and even metals; semisynthetic polymers such as cellulose acetate and hydroxpropylcellulose; and synthetic polymers such as acrylpolymers, PVA, polyester and nylon.

Currently most, if not all, cosmetic products (primarily treatment products) provided in the form of microcapsules are applied by hand. This is due to the fact that the microcapsules need to be broken to release the active ingredient encapsulated in them. The action of rubbing and pressure produced during the hand application process breaks the microcapsules. This process of application does not always guarantee the breakage of the microcapsules, however, because it is very dependent on the amount of rubbing and pressure exerted by the user during the application. Another problem with hand application is lack of precision or metering of the microencapsulated product.

SUMMARY OF THE INVENTION

An object of the present invention is to provide new and improved applicators and dispensers for liquid material, especially liquid cosmetic material, overcoming some or all of the difficulties presented by known types of applicator systems at least when employed with such materials, as referred to above. Another object is to provide such improvements, and solve existing application problems, for liquid cosmetic materials that require accurate metering, precise control and easy application, and that are applied to sensitive facial areas, e.g. the lips or eye region. A still further, specific object of the invention is to overcome some of the imperfections or shortfalls of current lipstick application systems for liquid cosmetic materials for the lips, i.e., to improve over the current application systems available for liquid, semiliquid and pasty lip type products, including products such as lip glosses, lip balms, lip moisturizers, lip coloring and long-lasting lipstick products.

Yet another object is to provide new and improved applicators and dispensers for applying products such as cosmetic materials which are provided in microcapsule form, affording assured virtually complete rupturing of the microcapsules during application, and thereby overcoming the problems heretofore encountered in hand application of microencapsulated products.

To these and other ends, the present invention in a first aspect broadly contemplates the provision of an applicator for liquid material including a reservoir for containing liquid material to be dispensed and having an opening through which liquid material is discharged from the reservoir, manually operable pressure-applying structure acting on liquid material within the reservoir to force liquid material from the reservoir out through the opening, and an applicator tip comprising rigid hollow tubular structure having an axis and an open forward end defined by a continuous edge, and, fixedly secured to this edge, a porous mesh membrane extending entirely across the open forward end of the tubular structure, the applicator tip being disposed at the reservoir opening such that liquid material discharged from the reservoir passes through the mesh.

As currently preferred features of the invention, in at least many embodiments, the continuous edge of the tubular structure lies in a plane transverse to the axis of the tubular structure, and the porous mesh membrane is a planar mesh lying substantially in this transverse plane. Still more preferably, especially for specific types of products such as liquid lip cosmetic materials, the latter plane is oblique to the plane normal to the axis of the tubular structure, very preferably being oriented at an angle of not more than about 45° to the plane normal to the tubular structure. A convenient value of the angle between the oblique plane (in which the mesh membrane lies) and a plane normal to the axis of the tubular structure of the applicator tip is about 30°.

An alternative embodiment employs, as the membrane, a porous mesh membrane preformed into a nose or chisel shape projecting forwardly from the forward end edge of the tubular structure, e.g. so as to have two or more forwardly converging surfaces respectively lying in different planes each oriented at an oblique angle to the plane normal to the axis of the tubular structure.

It will be understood that the terms "forwardly" (or "forward") and "rearwardly" (or "rear" or "rearward") herein respectively refer to directions, along the geometric major axis of the applicator, toward and away from the end of the applicator at which the applicator tip mesh membrane is located.

In currently preferred embodiments of the applicator of the invention, the reservoir comprises a hollow reservoir tube for containing the liquid material, the reservoir tube having a rearward end and an open forward end which constitutes the reservoir opening. The tubular structure of the tip may be an integral end portion of the reservoir tube itself, or alternatively (and conveniently or preferably) it may be an element separate from the reservoir tube, having an open rearward end, and may be secured to the reservoir tube at the open forward end of the reservoir tube with the rearward end of the tubular structure opening into the reservoir tube.

Further in accordance with the invention, in embodiments wherein the reservoir tube is rigid, the pressure-applying structure may include a pusher element disposed within the reservoir tube initially adjacent the rearward end thereof for movement along the axis of the reservoir tube to exert pressure on liquid material disposed between the pusher element and the reservoir tube forward end, and a manually operable drive for moving the pusher element along the reservoir tube axis. Advantageously, the drive is selectively manually operable to move the pusher element either toward or away from the reservoir tube forward end. In these embodiments, the reservoir tube is typically axially rectilinear and substantially uniform in cross-section from end to end, and the tubular structure of the applicator tip is a separate axially rectilinear element having an open rearward end of substantially the same cross-section as the reservoir tube, and is secured to the reservoir tube in coaxial relation thereto.

The invention in this first aspect also embraces the provision of a dispenser for liquid cosmetic material, including, in combination, a body of the material to be dispensed and an applicator as described above, the reservoir of the applicator containing the body of liquid cosmetic material. The viscosity of the liquid cosmetic material may be between about 1,500 and about 25,000 cp. In certain currently preferred embodiments, the cosmetic material is a lip gloss or other product for application to the user's lips.

The applicators and dispensers of the invention overcome or mitigate the above-noted shortcomings of known applicators for liquid cosmetic materials. The invention gives consumers the ability to apply liquid lip or liquid eye products in the same convenient and precise controlled way they have become accustomed to while applying the harder bullet type products. The invention achieves this by presenting the product in exactly the same fashion as a lipstick bullet type mechanism. The only difference is that with the present invention, a metered liquid or semiliquid product is applied through a mesh. Thus, the applicators and dispensers of the invention can appear, and be used, just like a conventional so-called "slimline" bullet lipstick unit. The applicators of the invention also improve, in applying the current and newly developed liquid products, over current commercial applicator systems.

In a second aspect, the invention contemplates the provision of a dispenser for microencapsulated products, again including an applicator as described above, and a quantity of microcapsules disposed in the reservoir so as to be advanced to and against the mesh membrane by the pressure-applying structure, wherein the mesh is dimensioned and adapted to rupture the microcapsules as the latter are pressed against it, with the result that the liquid or fluent material contained in the microcapsules is forced outwardly through the mesh.

The solution of the present invention, in this second aspect, to the problem of assuring almost full breakage of the microcapsules is that the mesh is used to break these microcapsules consistently and precisely, by having the microencapsulated product forced through the correctly sized mesh, typically or preferably having openings between about 30% and about 70% (dependent on the hardness of the shell material used for making the microcapsules) smaller than the diameter (typically between about one and about 1200 microns) of the microcapsules to be ruptured. As in the first aspect of the invention, the pressure that forces the product through the mesh is preferably produced by a pusher or plunger system driven toward the mesh by a manually operable drive such as a screw mechanism.

In both aspects, the invention in a specific sense contemplates the provision of a particularly advantageous applicator tip and mesh membrane structure, i.e., in the above-defined combination with reservoir and manually operable pressure-applying structures. In accordance with the invention in this specific sense, the membrane is a woven mesh screen, and the tubular structure of the applicator tip is a molded plastic member formed by an injection molding method wherein the screen is an insert so as to be molded into the continuous forward edge of the tubular structure around the entire periphery of the screen, and thereby held under sufficient tension so that it does not flex substantially during use. Preferably the fiber of which the screen is woven is a plastic (synthetic fiber) mesh, nylon, polyester, or a combination of nylon and polyester being currently preferred although other materials can be used such as polypropylene, or even natural materials such as silk and cotton.

In this specific sense, it is preferred that the percentage of open area per unit area of the screen is between about 30% and about 60%, and that the mesh size (opening size) of the screen is about 5 to about 500 microns, more preferably (for particular purposes) about 75 to about 350 microns. The tension of the screen when molded in to the forward continuous edge of the tip is preferably in a range of about 2 to about 12 Newton-cm.

Further features and advantages of the invention will be apparent from the detailed description hereinbelow set forth, together with the accompanying drawings.

BRIEF DESCRIPTION OF THE DRAWINGS

FIG. 1 is a side view of a liquid lip cosmetic applicator embodying the present invention in a particular form;

FIG. 2 is an enlarged sectional side view of the applicator;

FIG. 3 is a side view, partly in section, of the applicator with the cap removed and the pusher element extended;

FIG. 4 is an end view of the tip of the applicator;

FIGS. 10A and 10B are exterior and sectional side views, respectively, the tip element of the applicator;

FIGS. 11A and 11B are views of the inner and outer ends, respectively of the tip element of FIG. 10;

FIG. 12 is an enlarged fragmentary detail sectional view illustrating the manner in which the mesh membrane is mounted to the tubular structure of the tip element of FIG. 10;

FIG. 13 is an enlarged fragmentary perspective view of another embodiment of the applicator of the invention.

DETAILED DESCRIPTION

Figure 5:
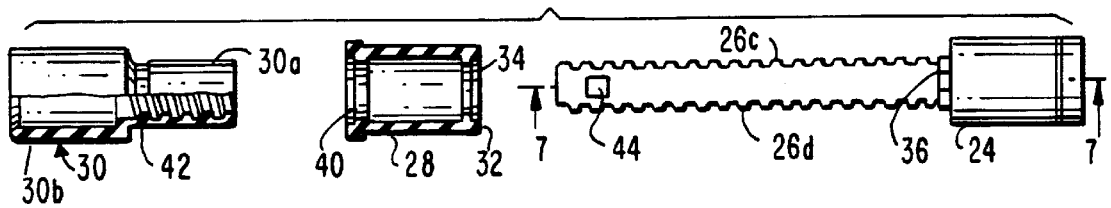
FIG. 5 is an exploded side view, partly in section, of the drive mechanism for the applicator.
Figure 8A:
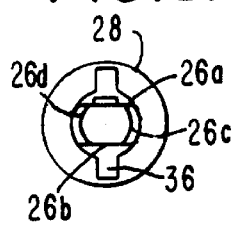
FIGS. 8A and 8B and are end views of the lead holder and guide, respectively, in the mechanism of FIG. 5.

FIGS. 1–12 of the drawings illustrate one specific embodiment of a lip cosmetic applicator or dispenser 10 embodying the present invention. As there shown, the applicator includes a body 11 and a cap 12 which, when assembled together, constitute an axially elongated cylinder (FIGS. 1 and 2) having a central annular bead 14 and comparable in dimensions to conventional hand-held lipstick applicators of the "slimline" bullet type. The term "slimline" is a generic designation for lipstick applicators wherein the bullet diameter (e.g. about 0.300–0.400 inch) is substantially smaller in diameter than the usual present-day lipstick bullet (which is typically 0.477–0.500 inch in diameter) and the package dimensions are also smaller than usual.

More particularly, the body 11 of the applicator of FIG. 1 has a more or less thin-walled but substantially rigid, axially elongated cylindrical external shell 16 which is hollow, has one open end and one closed end, and is typically formed of a metal such as aluminum; the cap has an external cylindrical shell 18 which may be identical to the body shell 16. When the cap is mounted in the applicator-closing position illustrated in FIGS. 1 and 2, the open ends of the body and cap shells are disposed in coaxial tandem relation to each other with their open ends facing and separated by the bead 14. The cap includes an inner molded plastic sealing member 19 in the form of a rearwardly-opening cup seated within the forward portion of the shell 18 and glued thereto at its end; this sealing member seats snugly and sealingly over the forward portion of the body 11, but the cap can be removed manually from the body by pulling in an axial direction.

As further shown in FIG. 2, within the shell 16 the body 11 also includes a generally cylindrical, axially elongated ferrule 20, open at both ends and formed of a metal such as brass or high-purity aluminum; the bead 14 is formed integrally in the ferrule, as an outward projection on the surface thereof. The major axial extent 20a of the ferrule is disposed rearwardly of this bead (being enclosed within the body shell 16) although a minor axial extent 20b of the ferrule projects forwardly of the bead and the open end of the cap shell 18 seats thereon when the cap is placed in its applicator-closing position. Rearwardly of the bead 14, in the region indicated by numeral 21, the outer surface of the ferrule is bonded to the inner surface of the body shell 16 with hot melt glue.

A generally rigid, axially elongated and open-ended cylindrical reservoir tube 22 formed of aluminum is disposed concentrically within the ferrule 20 and has an exposed portion 22a projecting forwardly from the ferrule. The cap sealing member 19 engages this exposed tube portion 22a when the cap is in closed position on the applicator 10. The tube 22 is dimensioned to fit snugly within the ferrule, yet to be manually rotatable relative to the ferrule when a user's hands respectively grasp the body shell 16 (which is glued to the ferrule) and the exposed forward portion 22a of the tube 22 and turn one of the grasped elements relative to the other about their common geometric axis.

Disposed within the tube 22 is a pusher element comprising a forwardly opening cylindrical cup 24 or "lead holder" having a threaded stem 26 formed integrally with and projecting rearwardly from the closed rear end of the cup along the common geometric axis of the ferrule, tube 22 and cup. This cup fits snugly but slidably within the tube 22, so as to be reciprocally movable forwardly and rearwardly along the aforementioned common axis. The stem 26 extends rearwardly through and beyond a guide element 28 mounted in the rear open end of the tube 22 and a driver element 30 mounted in a rear portion of the ferrule 20, both the guide element and the driver element being coaxial with the tube 22 and the ferrule. Taken together, the cup 24 with its integral stem 26, the guide element 28 and the driver element 30 (all of which are conveniently molded plastic elements) constitute a manually operable subassembly 31 for applying forwardly-directed pressure on a body of liquid cosmetic material contained in and forwardly of the cup within the tube 22, as hereinafter further explained.

The cup stem 26 is flattened on opposite sides 26a, 26b (FIG. 8A) along its entire length, such that its minimum cross-sectional dimension (measured between its opposed flattened sides) is substantially smaller than its diameter as measured between its opposed unflattened portions 26c, 26d, which are the threaded portions of its surface. The guide element 28 is a hollow, generally cylindrical element open at is rear end and having at its forward end a transverse wall 32 defining an elongated aperture 34 (FIG. 8B) dimensioned to receive the stem 26 with clearance when the minimum cross-sectional dimension of the stem is oriented horizontally in the view of FIG. 8B, but to prevent relative rotation of the stem and guide element about the aforementioned common axis. In assembled arrangement, with the guide element 28 fixedly mounted in the rear end of the reservoir tube 22, the cup 24 disposed within the reservoir tube, and the stem 26 extending rearwardly through the aperture 34, the stem and cup can move axially but not rotatably relative to the tube 22.

Figure 6:
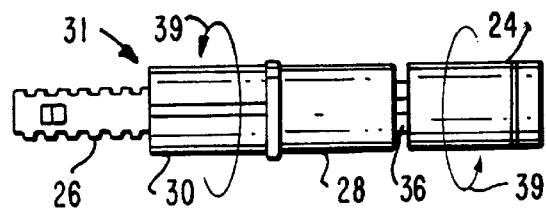
FIG. 6 is an assembled side view of the mechanism of FIG. 5.
Figure 9A:
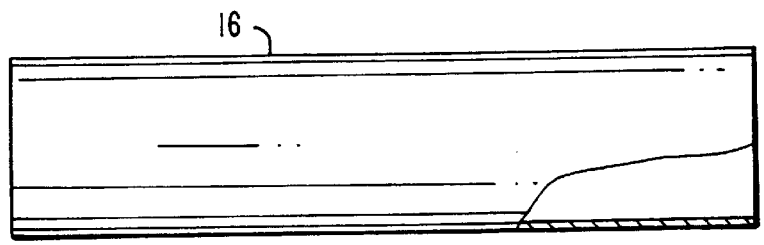
FIGS. 9A, 9B, 9C and 9D are side views, partly in section, of the base, ferrule, reservoir tube and cap, respectively, of the applicator.
Figure 9B:
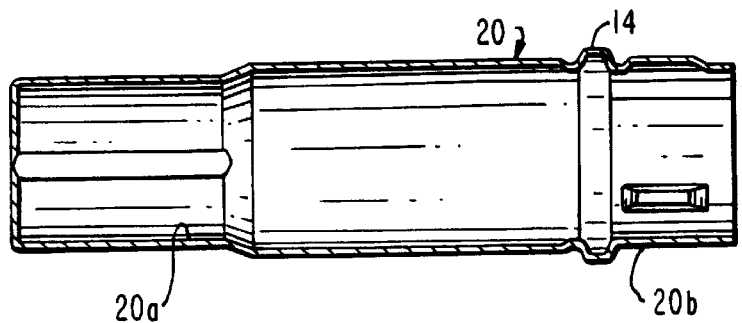
Figure 9C:
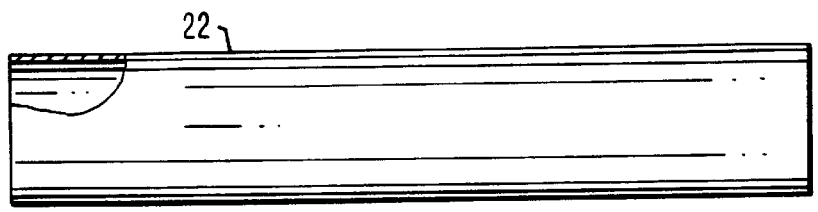
Figure 9D:
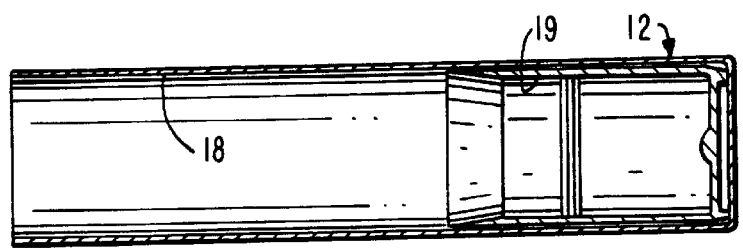
Figure 11A:
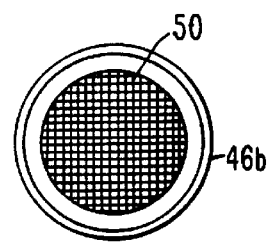
Figure 10A:
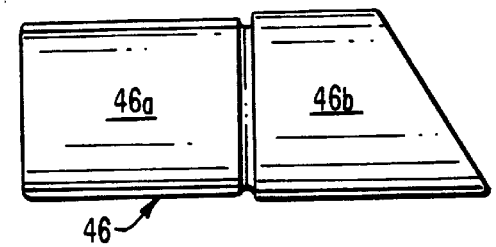

The driver element 30 has integrally formed forward and rearward portions 30a and 30b defining a common open-ended passage through which the stem 26 extends. The forward portion 30a is smaller in both external and internal diameter than the rearward portion 30b and has an internal thread that engages the thread of the stem 26; this forward portion of the driver element is dimensioned to be rotatably received within the guide element 28. As illustrated in FIG. 6, to constitute the subassembly 31, the guide element 28 is first slid forwardly over the stem 26, with the long dimension of opening 34 and the maximum cross-sectional dimension (diameter between threaded surface portions) of stem 26 in register, until the transverse wall 32 abuts a stop projection 36 formed on the rearward surface of the cup. The driver element, with portion 30a oriented forwardly, is then manually threaded over the stem (by turning the driver element and the cup 24 relative to each other in the directions indicated by arrows 39) until portion 30a is fully received within the guide element and an annular ridge 40 formed on the rear inner surface of the guide element seats within an annular recess 42 formed in the rear outer surface of portion 30a. The respective internal and external dimensions of the guide element 28 and the driver element portion 30a, and the compressibility or deformability of the plastics of which they are made, are such that as the driver element is being threaded on the stem, its portion 30a can be forced past the ridge 40, but once the ridge seats in the recess 42, the guide and driver elements are effectively retained against axial movement relative to each other, although they are still rotatable relative to each other. The mating threads of stem 26 and driver element portion 30a are left-handed threads, as arrows 39 show.

Figure 7:
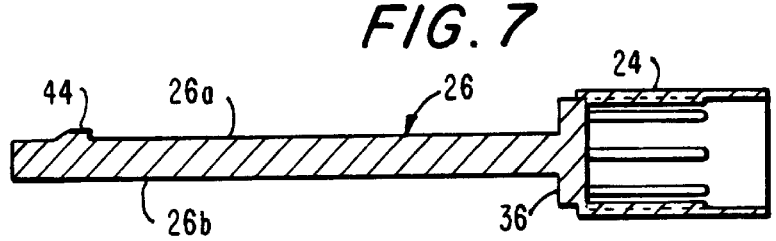
FIG. 7 is a somewhat enlarged sectional view of the pusher element or lead holder taken as along the line 6–6 of FIG. 5.
Figure 8B:
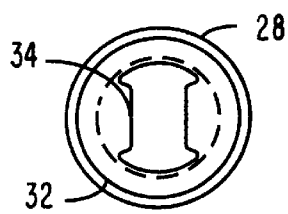

A rearwardly sloping projection 44 is formed on the rearward portion of one of the flattened sides of the stem 26 (FIG. 7). This projection is forced through the guide element aperture 34 as the guide element is initially slid forwardly over the stem, and then acts as a stop (by interference with the edge of the aperture) to limit forward movement of the stem and cup 24.

As stated, the driver element 30 and the guide element 28 are respectively fixedly secured to rear end portions of the ferrule 20 and reservoir tube 22. Thus, when the ferrule and tube 22 are manually rotated relative to each other about their common axis, i.e. by manipulation of the forward portion of the tube and of the body shell 16 which is glued to the ferrule, the driver element 30 rotates relative to the stem 26 (since the stem is held against rotation by the guide element) and thereby causes the cup to move in an axial direction forwardly or rearwardly within the tube 22, depending on the direction of such relative rotation.

As a particular feature of the present invention, in its illustrated embodiment, at the open forward end of the tube 22 there is mounted a rigid, hollow, open-ended, generally cylindrical applicator tip 46 of molded plastic, having a rearward portion 46a inserted and fixedly secured within the forward end portion of the tube 22, and a forward portion 46b projecting forwardly beyond the tube 22 and terminating in a continuous (annular) edge 48 which lies in a plane oblique to the plane 51 (FIG. 10B) normal to the common geometric axis 53 of the tip 46, tube 22 and ferrule 20. A currently preferred angle α for this plane is about 30° relative to the plane 51 normal to the latter geometric axis. More generally, the angle α may be in a range between 0° and about 45° although it is preferred that the angle be greater than 0°; if the angle exceeds 45°, the application of cosmetic material by the user becomes cumbersome and poorly controlled.

Mounted fixedly and securely to the applicator tip edge 48 (so as to extend completely over the forward applicator opening defined by the edge 48) is a porous planar woven mesh membrane or screen 50, lying in the aforementioned oblique plane, and anchored to the edge 48 around its entire periphery. Thus, in the described embodiment of the invention, the screen 50 lies in a plane at an angle of 30° to the plane normal to the geometric axis of tip 46 and tube 22. The screen 50 may conveniently be seated and anchored in the forward edge of the applicator tip as the tip is molded, the edge 48 being formed in the molding operation so as to overlap and securely grip the peripheral edge of the screen.

The screen 50 is a woven mesh typically made with synthetic fibers such as fibers of nylon or polyester, or a combination of the two. Mesh size may be varied with the viscosity of the liquid cosmetic material to be applied by the device. A currently preferred range of mesh sizes is that between about 75 and about 350 microns, one exemplary preferred size being 150 microns. One specific example of a suitable material for the screen 50 is the "Nytex" (trademark) nylon screen No. 3-150-51, commercially available from Tetco Inc., 333 South Highland Avenue, Briarcliff Manor, N.Y. 10510-2000, which has a mesh size of 150 microns and 51% open area per square inch of mesh.

The described applicator, as stated, is suitable for dispensing and applying liquid cosmetic products for the lip, e.g., materials having a viscosity typically in a range between about 1,500 and 25,000 centipoise. Typical or illustrative dimensions for the device, similar to those of known "slimline" bullet-type lip gloss applicators, are an overall axial length (when closed) of about 4.2 inches, an outer diameter of about 0.5 inch, and a diameter of the product discharge opening (measured in a plane normal to the geometric axis of tube 22) of about 0.35 inch.

The operation of the applicator may now be readily explained.

A quantity of liquid cosmetic material, e.g. a lip gloss, is placed within the reservoir tube 22 between the cup 24 and the screen 50, so as to fill the cup and at least part of the enclosed reservoir volume 51 forwardly thereof, and thereby to constitute the applicator as a dispenser of the liquid cosmetic material. In this condition, with the cap in place, the dispenser may be sold to an end user.

For application of the contained material to the lips, the user removes the cap 12 and rotates the exposed forward portion of the reservoir tube 22 relative to the body shell 16 (and, thus, relative to ferrule 20 and driver element 30). Rotating the tube 22 causes the stem-guide element-driver element subassembly 31 to advance the cup 24 forwardly in the tube 22, thereby exerting forwardly-directed pressure on the contained liquid cosmetic material body within and forwardly of the cup in region 51 in tube 22. The pressure thus generated forces the liquid cosmetic material through the planar screen 50 located at the forward end of the applicator tip 46; the amount of material forced through the screen can be metered by the amount which the liquid tube is rotated.

The user applies the screen 50 to the lips to transfer thereto the lip gloss or other liquid cosmetic material which has been forced outwardly through the screen and is available on the outer surface of the screen. While the mesh may deform slightly under the pressure of the liquid cosmetic material being forced there-through, it is sufficiently resistant to flexing or deformation so that it remains substantially planar and effectively rigid during product application. The oblique (e.g., 30°) angle of the screen relative to the plane normal to the long axis of the applicator simulates a typical application surface angle of a conventional bullet body of lipstick or the like; and the since overall shape and dimensions of the applicator correspond to those of present-day "slimline" lip gloss applicators of the bullet type, the lip gloss applying operation is manipulatively substantially the same as that of applying bullet-type lip cosmetics.

Following application, the liquid cosmetic material can be made to retreat below the applicator screen 50 by rotating the reservoir tube 22 in a direction counter to that used to advance the material through the screen for application, thereby rendering the application surface of the screen ready for storage and the next subsequent use. The dispenser/applicator can then again be sealed air-tight by replacing the cap 12, the sealing member 19 of which forms an air-tight inner seal by engagement with the exposed forward portion 22a of tube 22.

In the alternative embodiment of FIG. 13, which (except for the features hereinafter specifically described) may be identical to that of FIGS. 1–12, the porous mesh screen 150 mounted to the forward edge 148 of the applicator tip 146 does not lie in the plane of edge 148 but projects forwardly therefrom, being preformed to a nose or chisel shape having two opposed, obliquely angled, forwardly converging application surfaces 150a and 150b for use in simultaneously applying a liquid lip product to a user's upper and lower lips. The surfaces 150a and 150b respectively lie in different planes each forming an oblique angle of not more than 45° with the plane transverse to the axis of the applicator tip. As in FIGS. 1–12, the membrane 150 may be a woven nylon mesh screen of the type described above, and is anchored to the applicator tip edge 148 around its entire periphery.

In the embodiments of the invention described above, the manually operable pressure-applying structure for forcing liquid material out through the opening is a pump mechanism, exemplified by a pusher element, driver element and associated instrumentalities. Alternatively, other forms of structures for performing the function of pushing the product out of the applicator may be used instead of a pump mechanism; examples of such alternatives include (without limitation) squeeze tubes and bottles, which may be more appropriate than a pump mechanism when the applicator of the invention is used for facial products such as foundations or blushers.

In an illustrative specific embodiment of the second aspect of the invention, there is provided a dispenser for a microencapsulated product, constituted of an applicator as described above and a quantity of microcapsules disposed within the reservoir so as to be advanced to and against the screen by the pusher element when manually operated. It may be desirable to modify the structure for use with a microencapsulated product, for example by forming the pusher element as a plunger and orienting the forward continuous edge of the applicator tip tubular structure and the screen 50 in a plane perpendicular (rather than oblique) to the axis of the tubular structure.

The size of the microcapsules typically or generally ranges from about one to about 1200 microns in size. A preferred range, for at least many purposes, being between about 5 and about 500 microns. Materials used in making the capsule shell may include, without limitation, natural or organic materials such as gelatin, gum arabic, agar, sugar, starch and even metals; semisynthetic polymers such as cellulose acetate and hydroxypropylcellulose; and synthetic polymers such as acrylpolymers, PVA, polyester and nylon. Each shell completely surrounds and contains a small quantity of a fluid or liquid product, such as a cosmetic material, to be applied.

The mesh is dimensioned and adapted to rupture the microcapsules as the latter are pressed against it, with the result that the liquid or fluent material contained in the microcapsules is forced outwardly through the mesh. The mesh openings, in accordance with current preference, can be between about 30% and about 70% (dependent on the hardness of the shell material used for making the microcapsules) smaller than the diameter of the microcapsules to be ruptured.

As particular features of the invention, for use in both aspects thereof, the membrane carried by the applicator tip is a woven mesh screen, and the tubular structure of the applicator tip is a molded plastic member formed by an injection molding method wherein the screen is an insert so as to be molded into the continuous forward edge of the tubular structure around the entire periphery of the screen, and thereby held under sufficient tension so that it does not flex substantially during use. Preferably the fiber of which the screen is woven is a plastic (synthetic fiber) mesh, nylon, polyester, or a combination of nylon and polyester being currently preferred although other materials can be used such as polypropylene, or even natural materials such as silk and cotton.

A currently preferred percentage of open area per unit area of the screen is between about 30% and about 60%; as an example, a fiber of 60 microns woven into a square weave pattern and requiring a mesh size of 150 microns would yield 51% open area of the square surface area of the screen. The mesh size (opening size) of the screen is typically about 5 to about 500 microns, more preferably (for particular purposes) about 75 to about 350 microns. The tension of the screen when molded in to the forward continuous edge of the tip is preferably in a range of about 2 to about 12 Newton-cm. A square (plain) weave has been found satisfactory with the products tested using the applicator of the invention.

The preferred size range (total area) of the screen is from 160 to 645 square millimeters. This would be the preferred surface area for application with any of the disclosed embodiments.

Figure 14:
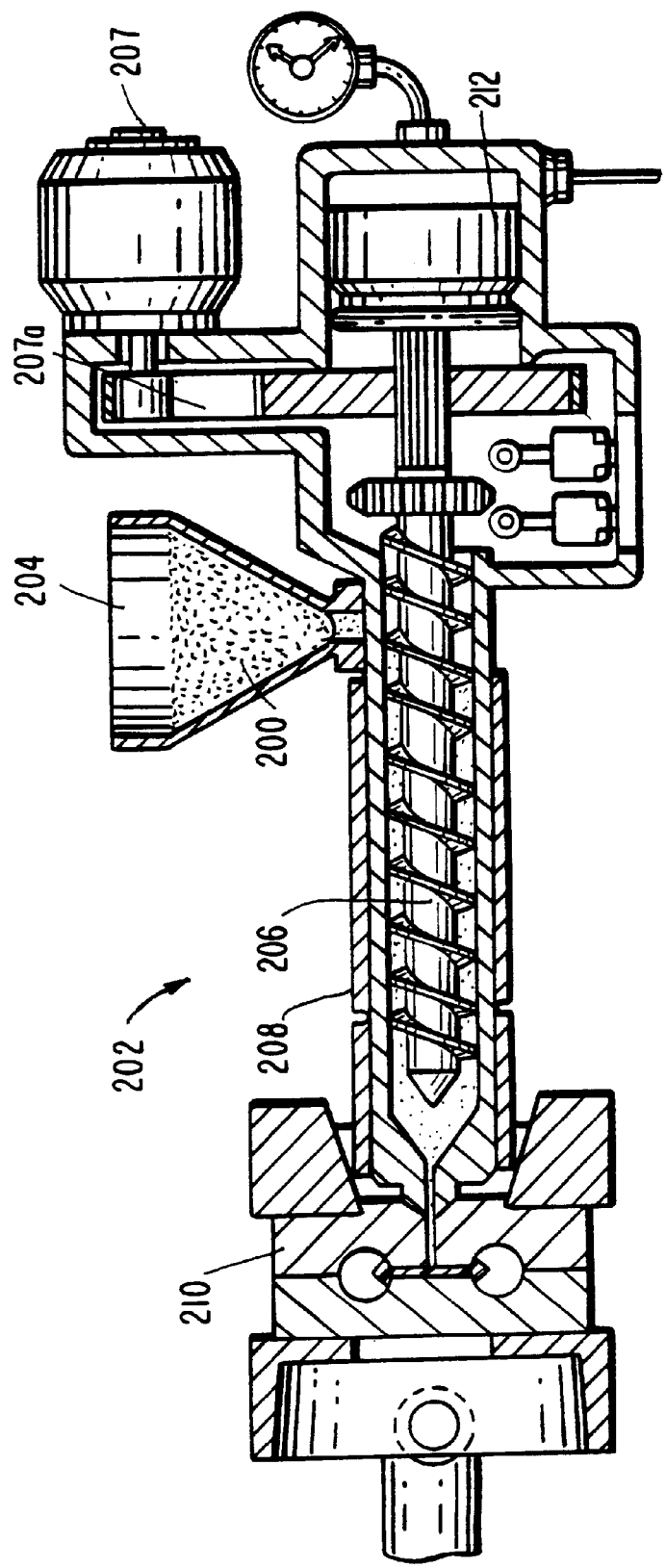
FIG. 14 is a simplified schematic side elevational sectional view of injection molding equipment for producing the applicator tip tubular structure with the mesh screen molded in the forward continuous edge thereof as an insert.

The construction of the applicator tip and the screen may be further understood by reference to FIG. 14, which illustrates in a simplified schematic manner an exemplary type of injection molding equipment in which the tubular structure of the applicator tip can be produced with a molded in screen.

The particular injection molding process used in the manufacturing of the tip is a variation of a technology known as "In Mold Process/Label." The difference between the production of the applicator tip with molded in screen, and the conventional practice of that technology, is that instead of applying or molding in a label to the injection-molded part, the present invention involves molding in the woven mesh (e.g. nylon) screen.

Referring to FIG. 14, the plastic 200 is introduced in pellet form into the injection-molding machine 202 via the material hopper 204; the preferred plastic for the tip that retains the mesh is nylon.

The material is fed from the hopper via gravity into the screw 206 of the machine. Driven by a motor 207 through a gear train 207a, the screw rotates and slowly moves the material forward in the barrel 208 while it is slowly being pushed back by the back pressure being produced by the advancing material. The material is gradually melted. In the case of the preferred material, it is melted to between 450° and 500° F. and prepared for injection into the mold 210.

The injection of the material into the mold is accomplished with hydraulic pressure applied to the screw 206 by a hydraulic piston 212. When the material is ready for injection the screw stops its rotation and is locked to become a plunger or piston to drive the material into the mold 210 at high velocity and pressure. Material pressures at time of injection can easily exceed 20,000 psi.

The mold 210 is designed to allow the mesh to pass through it and has specially designed molding inserts that produce the desired shape of the tip. The mold, during the preparation for the incoming material, closes and sandwiches the mesh between the specially designed molding inserts. These inserts die-cut and hold the mesh in place for the incoming injection of material. More particularly, the mold design incorporates features to allow various tension levels of the mesh. Once all this has taken place the material is introduced. The material is injected, as mentioned above and takes the shape of the inserts. The hot material also bonds itself with the mesh and thus becomes one with the tip. The material is then cooled to an adequate temperature to allow the removal of the part.

It is to be understood that the invention is not limited to the features and embodiments hereinabove set forth, but may be carried out in other ways without departure from its spirit.

What is claimed is:

1. An applicator for liquid material, including:
   (a) a reservoir comprising a rigid, hollow, axially rectilinear reservoir tube for containing liquid material to be dispensed and having a rearward end and an open forward end constituting an opening through which liquid material is discharged from the reservoir, said reservoir tube being substantially uniform in cross-section from end to end;
   (b) manually-operable pressure-applying structure acting on liquid material within the reservoir to force liquid material from the reservoir forwardly through the opening; and
   (c) an applicator tip comprising rigid hollow tubular structure having an axis and an open forward end defined by a continuous peripheral edge of the tubular structure lying in a plane oblique to said axis, and, fixedly secured to said edge and located entirely interiorly thereof, a porous planar mesh membrane extending entirely across said open forward end and lying substantially in said oblique plane, said tip being disposed at said opening such that liquid material discharged from said reservoir passes through said membrane, said tubular structure being axially rectilinear, having an open rearward end of substantially the same cross-section as the reservoir tube, and being disposed at said open forward end of said reservoir tube in coaxial relation thereto with said rearward end of said tubular structure opening into said reservoir tube, and said membrane remaining substantially planar during use to apply liquid material.

2. An applicator as defined in claim 1, wherein said oblique plane is at an angle of not more than about 45° to a plane normal to the axis of the tubular structure.

3. An applicator as defined in claim 1, wherein said tubular structure of said tip is an element separate from said reservoir tube and is secured to said reservoir tube at said open forward end of said reservoir tube.

4. An applicator as defined in claim 1, wherein said pressure-applying structure includes a pusher element disposed within said reservoir tube initially adjacent said rearward end thereof for movement along said axis to exert pressure on liquid material disposed between the pusher element and the reservoir tube forward end, and a manually operable drive for moving said element along said axis.

5. An applicator as defined in claim 4, wherein said drive is selectively manually operable to move said pusher element either toward or away from said reservoir tube forward end.

6. An applicator as defined in claim 5, wherein said tubular structure of said tip is an element separate from said reservoir tube and is secured to said reservoir tube at said open forward end of said reservoir tube.

7. An applicator as defined in claim 4, wherein said membrane is a woven synthetic fiber mesh.

8. An applicator as defined in claim 7, wherein said mesh comprises nylon, polyester, or a combination of nylon and polyester.

9. An applicator as defined in claim 8, wherein said membrane is a nylon mesh.

10. An applicator as defined in claim 8, wherein said membrane has a mesh size of about 75 to about 350 microns.

11. An applicator as defined in claim 7, wherein said oblique plane is at an angle of about 30° to a plane normal to said axis of said tubular structure.

12. An applicator for liquid material, including:
   (a) a reservoir comprising a rigid, hollow, axially rectilinear reservoir tube for containing liquid material to be dispensed and having a rearward end and an open forward end constituting an opening through which liquid material is discharged from the reservoir, said reservoir tube being substantially uniform in cross-section from end to end;
   (b) manually-operable pressure-applying structure acting on liquid material within the reservoir to force liquid material from the reservoir forwardly through the opening; and
   (c) an applicator tip comprising rigid hollow injection molded tubular structure having an axis and an open forward end defined by a continuous peripheral edge of the tubular structure lying in a plane transverse to said axis, and, fixedly secured to said edge and located entirely interiorly thereof, a porous planar woven mesh screen extending entirely across said open forward end and lying in said transverse plane, said tip being disposed at said opening such that liquid material discharged from said reservoir passes through said screen, and said screen being molded in said tip, said tubular structure being axially rectilinear, having an open rearward end of substantially the same cross-section as the reservoir tube, and being disposed at said open forward end of said reservoir tube in coaxial relation thereto with said rearward end of said tubular structure opening into said reservoir tube, and said screen remaining substantially planar during use to apply liquid material.

13. An applicator as defined in claim 12, wherein the continuous edge of the tubular structure lies in a plane oblique to the plane normal to the axis of the tubular structure and the membrane is a planar membrane lying substantially in said oblique plane.

14. An applicator for liquid material, including:
(a) a reservoir comprising a rigid, hollow, axially rectilinear reservoir tube for containing liquid material to be dispensed and having a rearward end and an open forward end constituting an opening through which liquid material is discharged from the reservoir, said reservoir tube being substantially uniform in cross-section from end to end;
(b) manually-operable pressure-applying structure acting on liquid material within the reservoir to force liquid material from the reservoir forwardly through the opening; and
(c) an applicator tip comprising rigid hollow tubular structure having an axis and an open forward end defined by a continuous peripheral edge of the tubular structure lying in a plane oblique to said axis, and, fixedly secured to said edge and located entirely interiorly thereof, a porous mesh membrane extending entirely across said open forward end and preformed to a nose or chisel shape projecting forwardly from said continuous edge and providing at least two forwardly converging application surfaces, said tip being disposed at said opening such that liquid material discharged from said reservoir passes through said membrane, said tubular structure being axially rectilinear, having an open rearward end of substantially the same cross-section as the reservoir tube, and being disposed at said open forward end of said reservoir tube in coaxial relation thereto with said rearward end of said tubular structure opening into said reservoir tube, and said membrane being a woven synthetic fiber mesh that remains substantially planar during use to apply liquid material.

15. A dispenser for liquid cosmetic material, including:
(a) a body of liquid cosmetic material to be dispensed;
(b) a reservoir comprising a rigid, hollow, axially rectilinear reservoir tube containing said body of liquid cosmetic material and having a rearward end and an open forward end constituting an opening through which liquid material is discharged from the reservoir, said reservoir tube being substantially uniform in cross-section from end to end;
(c) manually-operable pressure-applying structure acting on liquid cosmetic material within the reservoir to force liquid cosmetic material from the reservoir forwardly through the opening; and
(d) an applicator tip comprising rigid hollow tubular structure having an axis and an open forward end defined by a continuous peripheral edge of the tubular structure, and, fixedly secured to said edge and located entirely interiorly thereof, a porous planar mesh membrane extending entirely across said open forward end, said tip being disposed at said opening such that liquid cosmetic material discharged from said reservoir passes through said membrane, said tubular structure being axially rectilinear, having an open rearward end of substantially the same cross-section as the reservoir tube, and being disposed at said open forward end of said reservoir tube in coaxial relation thereto with said rearward end of said tubular structure opening into said reservoir tube, and said membrane being a woven synthetic fiber mesh that remains substantially planar during use to apply liquid material.

16. A dispenser as defined in claim 15, wherein the continuous edge of the tubular structure lies in a plane transverse to the axis of the tubular structure and the membrane is a planar membrane lying substantially in said transverse plane.

17. A dispenser as defined in claim 15, wherein the continuous edge of the tubular structure lies in a plane oblique to the plane normal to the axis of the tubular structure and the membrane is a planar membrane lying substantially in said oblique plane.

18. An applicator as defined in claim 17, wherein said oblique plane is at an angle of not more than about 45° to a plane normal to the axis of the tubular structure.

19. A dispenser as defined in claim 17, wherein said liquid cosmetic material has a viscosity of between about 1,500 and about 25,000 cp.

20. A dispenser as defined in claim 15, wherein said membrane is preformed to a nose or chisel shape projecting forwardly from said continuous edge and providing at least two forwardly converging application surfaces.

21. A dispenser as defined in claim 15, wherein said liquid cosmetic material is contained in microcapsules and said body comprises a quantity of said microcapsules containing said liquid cosmetic material to be dispensed.

22. A dispenser for microencapsulated liquid material, including:
(a) a quantity of microcapsules of a liquid material to be dispensed;
(b) a reservoir containing said quantity of microcapsules and having an opening for discharge of material from the reservoir, and
(b) manually-operable pressure-applying structure acting on the quantity of microcapsules within the reservoir to advance microcapsules of said quantity forwardly to the opening,
wherein the improvement comprises:
(c) an applicator tip comprising rigid hollow tubular structure having an axis and an open forward end defined by a continuous peripheral edge of said tubular structure, and, fixedly secured to said edge and located entirely interiorly thereof, a porous planar mesh membrane extending entirely across said open forward end, said tip being disposed at said opening such that microcapsules advanced forwardly through said reservoir to the opening are forced against and ruptured by said membrane.

23. A dispenser as defined in claim 22, wherein said microcapsules have a diameter between about 1 and about 1200 microns and wherein said porous planar mesh membrane is a woven mesh screen having mesh openings between about 30% and about 70% smaller than the diameter of the microcapsules.

24. An applicator for liquid material, including:
a) a reservoir for containing liquid material to be dispensed and having an opening through which liquid material is discharged from the reservoir, and (b) manually-operable pressure-applying structure acting on liquid material within the reservoir to force liquid material from the reservoir forwardly through the opening, wherein the improvement comprises:

(c) an applicator tip comprising rigid hollow tubular structure having an axis and an open forward end defined by a continuous peripheral edge of said tubular structure lying in a plane transverse to said axis, and, fixedly secured to said edge and located entirely interiorly thereof, a porous planar woven mesh screen extending entirely across said open forward end and lying substantially in said transverse plane, the tubular structure of the applicator tip being a molded plastic member formed by an injection molding method wherein the screen is an insert so as to be molded into the continuous forward edge of the tubular structure around the entire periphery of the screen, and thereby held under sufficient tension so that it does not flex substantially during use.

25. An applicator as defined in claim 24, wherein the screen is woven of synthetic fiber.

26. An applicator as defined in claim 25, wherein said synthetic fiber is selected from the class consisting of nylon polyester, and combinations thereof.

27. An applicator as defined in claim 24, wherein the percentage of open area per unit area of the screen is between about 30% and about 60%.

28. An applicator as defined in claim 24, wherein the mesh size of the screen is about 5 to about 500 microns.

29. An applicator as defined in claim 24, wherein the tension of the screen when molded in to the forward continuous edge of the tip is preferably in a range of about 2 to about 12 Newton-cm.

* * * * *